United States Patent
Miyagi et al.

(10) Patent No.: US 12,381,367 B2
(45) Date of Patent: Aug. 5, 2025

(54) LASER AMPLIFIER

(71) Applicant: Mitsubishi Electric Corporation, Tokyo (JP)

(72) Inventors: Yukari Miyagi, Tokyo (JP); Kenichi Hirosawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1106 days.

(21) Appl. No.: 17/332,632

(22) Filed: May 27, 2021

(65) Prior Publication Data

US 2021/0288460 A1 Sep. 16, 2021

Related U.S. Application Data

(63) Continuation of application No. PCT/JP2019/000233, filed on Jan. 8, 2019.

(51) Int. Cl.
*H01S 3/063* (2006.01)
*G02B 27/09* (2006.01)
*H01S 3/23* (2006.01)

(52) U.S. Cl.
CPC .......... *H01S 3/063* (2013.01); *G02B 27/0972* (2013.01); *H01S 3/2308* (2013.01)

(58) Field of Classification Search
CPC ..................................................... H01S 3/005
See application file for complete search history.

(56) References Cited

U.S. PATENT DOCUMENTS

| 2001/0010585 A1 | 8/2001 | Nishimura et al. |
| 2002/0171941 A1 | 11/2002 | Okada |
| 2015/0022806 A1 | 1/2015 | Shibata et al. |
| 2016/0301179 A1 * | 10/2016 | Watanabe ............ H01S 3/0632 |
| 2017/0102338 A1 | 4/2017 | Shibata et al. |

FOREIGN PATENT DOCUMENTS

| GB | 2197086 A * | 5/1988 | ........... H01S 3/2333 |
| JP | 3-15814 A | 1/1991 | |
| JP | 10-339891 A | 12/1998 | |
| JP | 2001-141966 A | 5/2001 | |
| JP | 2001-209081 A | 8/2001 | |
| JP | 2002-329935 A | 11/2002 | |

(Continued)

OTHER PUBLICATIONS

Machine translation of KR20120134016A (Year: 2012).*

(Continued)

*Primary Examiner* — Yuqing Xiao
*Assistant Examiner* — Zhengqing Qi
(74) *Attorney, Agent, or Firm* — Birch, Stewart, Kolasch & Birch, LLP

(57) ABSTRACT

A laser amplifier includes a planar optical waveguide for laser amplification, and an input optical system for inputting signal light to a core layer of the planar optical waveguide. The input optical system includes: a collimating lens for converting output light from a signal light source into parallel light; an anamorphic prism for reducing the beam width in a first direction of output light from the collimating lens; and a cylindrical lens for collecting output light from the anamorphic prism in a second direction, and output light from the cylindrical lens is input to the core layer.

4 Claims, 14 Drawing Sheets

(56) References Cited

FOREIGN PATENT DOCUMENTS

| | | | | |
|---|---|---|---|---|
| JP | 2006-222403 | A | | 8/2006 |
| JP | 2009123883 | A | * | 6/2009 |
| JP | 2013-89790 | A | | 5/2013 |
| JP | 2013-190252 | A | | 9/2013 |
| JP | 2013-254861 | A | | 12/2013 |
| JP | 2014-229738 | A | | 12/2014 |
| JP | 2014-229813 | A | | 12/2014 |
| KR | 20120134016 | A | * | 12/2012 |
| WO | WO 2018/087845 | A1 | | 5/2018 |

OTHER PUBLICATIONS

Machine translation of JP2009123883A (Year: 2009).*
International Search Report for PCT/JP2019/000233 mailed on Apr. 9, 2019.
Japanese Notice of Reasons for Refusal, issued in JP Application No. 2019-531184 dated Jul. 16, 2019.

* cited by examiner

LASER AMPLIFIER

CROSS REFERENCE TO RELATED APPLICATION

This application is a Continuation of PCT International Application No. PCT/JP2019/000233, filed on Jan. 8, 2019, which is hereby expressly incorporated by reference into the present application.

TECHNICAL FIELD

The present invention relates to a laser amplifier.

BACKGROUND ART

In the related art, laser amplifiers of a planar waveguide type have been developed (see, for example, Patent Literature 1). A laser amplifier of the planar waveguide type includes a planar optical waveguide for laser amplification. The planar optical waveguide has a laminated structure in which one core layer is disposed between two clad layers. The core layer is made of a laser medium, and each clad layer has a refractive index lower than that of the core layer. Excitation light as well as laser light to be amplified, that is, so-called "signal light" is input to the core layer. With the input excitation light absorbed by the laser medium, a so-called "population inversion state" is formed. When the input signal light is propagated inside the core layer in this state, the input signal light is amplified.

CITATION LIST

Patent Literature

Patent Literature 1: JP 2013-89790 A

SUMMARY OF INVENTION

Technical Problem

Hereinafter, the direction along the lamination direction in a laminated structure of a planar optical waveguide is referred to as the "vertical direction". Meanwhile, the direction along individual layers in the laminated structure, that is, the direction orthogonal to the lamination direction in the laminated structure is referred to as the "horizontal direction". Moreover, the beam width of signal light in the vertical direction may be referred to as "vertical beam width". The beam width of signal light in the horizontal direction may be referred to as "horizontal beam width". Furthermore, signal light input to each optical member and the signal light that has been input may be collectively referred to as "input light". Signal light output by each optical member and the signal light that has been output may be collectively referred to as "output light".

A laser amplifier of a planar waveguide type has an optical system (hereinafter referred to as "input optical system") for inputting signal light to the core layer of a planar optical waveguide. In recent years, from the viewpoint of meeting the demand for miniaturization of planar optical waveguides, it has been desired to reduce the beam width of input light to the core layer. In particular, from the viewpoint of meeting the demand for the thinning of the core layer, it has been desired to make the vertical beam width of the input light to be even smaller than the horizontal beam width of the input light.

As will be described later with reference to FIG. 6, an input optical system in a conventional laser amplifier of the planar waveguide type includes a collimating lens and a cylindrical lens. In a conventional laser amplifier of the planar waveguide type, in order to reduce the beam width of input light to the core layer, it is required to set the focal length of the cylindrical lens to a small value. Due to the small focal length of the cylindrical lens, the installation interval between the input optical system and the planar optical waveguide is small. Therefore, there is a problem that it is difficult to adjust the installation position of the input optical system with respect to the planar optical waveguide when the laser amplifier is assembled.

The present invention has been made to solve the disadvantage as described above, and an object of the present invention is to provide a laser amplifier in which it is easy to adjust the installation position of an input optical system with respect to a planar optical waveguide.

Solution to Problem

A laser amplifier of the present invention includes a planar optical waveguide for laser amplification, and an input optical system to input signal light to a core layer of the planar optical waveguide, in which the input optical system includes: a collimating lens to convert output light from a signal light source into parallel light: an anamorphic prism to convert output light from the collimating lens into parallel light having a reduced beam width in a first direction; and a cylindrical lens to collect output light from the anamorphic prism in a second direction, and output light from the cylindrical lens is input to the core layer, as the signal light having been collected in the second direction and to be propagated inside the core layer without changing the beam width in the first direction. The planar optical waveguide has a laminated structure including an upper clad layer, the core layer, and a lower clad layer, the first direction is set to be orthogonal to a lamination direction in the laminated structure, and the second direction is set to be parallel to the lamination direction in the laminated structure.

Advantageous Effects of Invention

According to the present invention configured as described above, it is possible to obtain a laser amplifier in which it is easy to adjust the installation position of an input optical system with respect to a planar optical waveguide.

DESCRIPTION OF EMBODIMENTS

To describe the present invention further in detail, an embodiment for carrying out the present invention will be described below with reference to the accompanying drawings.

First Embodiment

Figure 1:
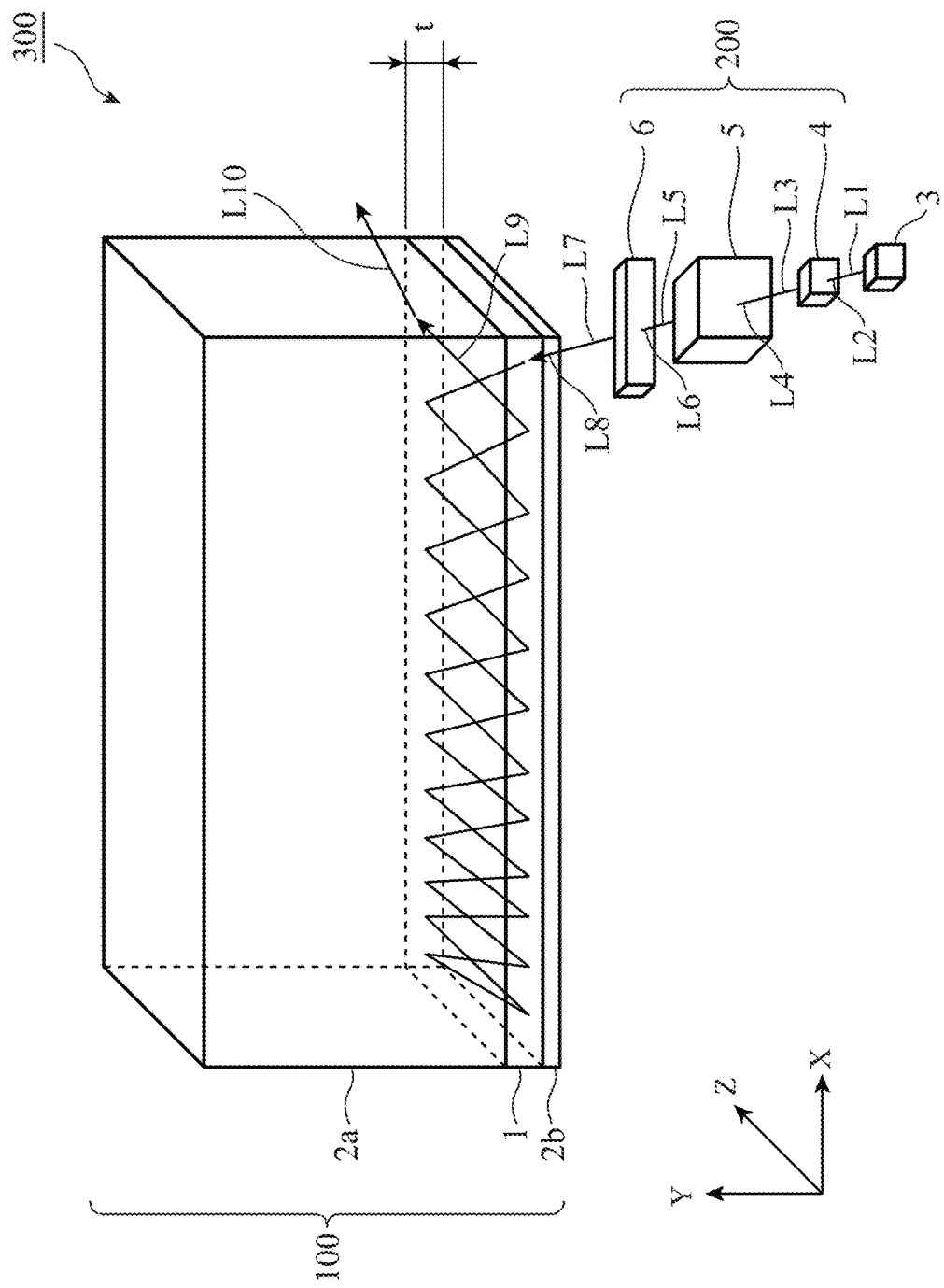
FIG. 1 is a perspective view illustrating the main part of a laser amplifier according to a first embodiment.
Figure 2:
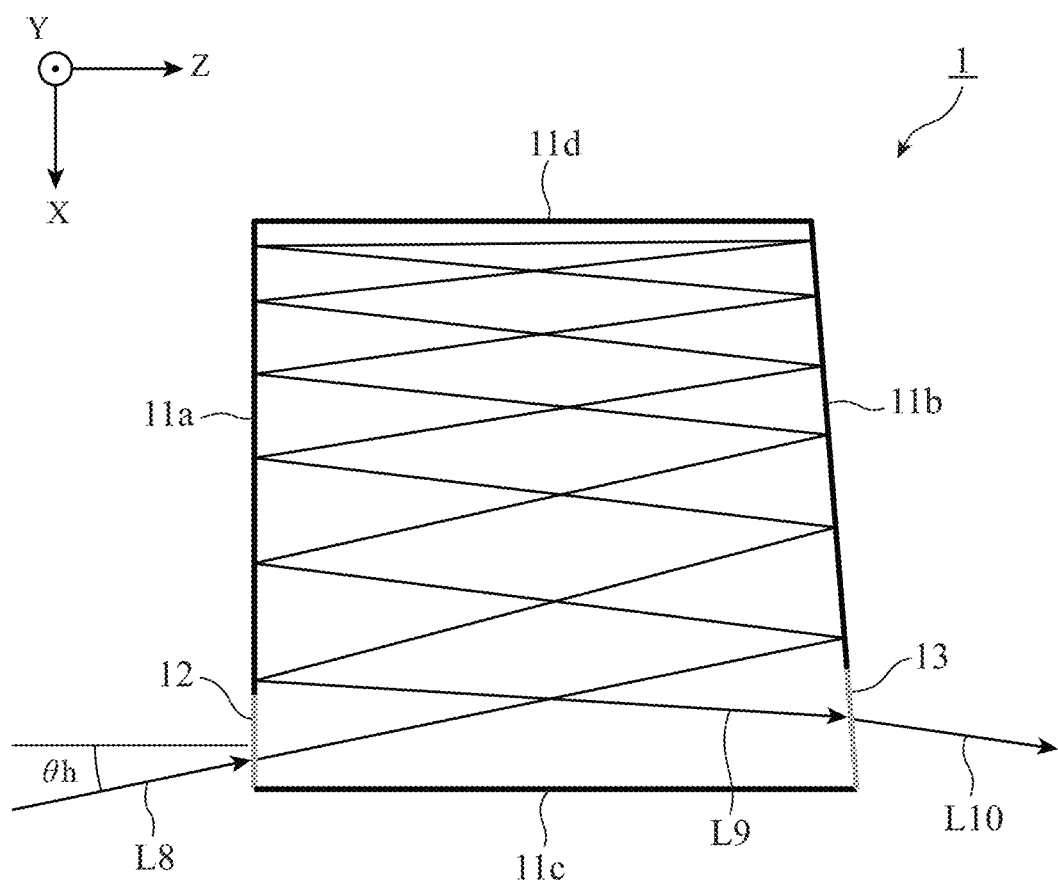
FIG. 2 is a plan view illustrating a core layer of a planar optical waveguide of the laser amplifier according to the first embodiment.
Figure 3A:
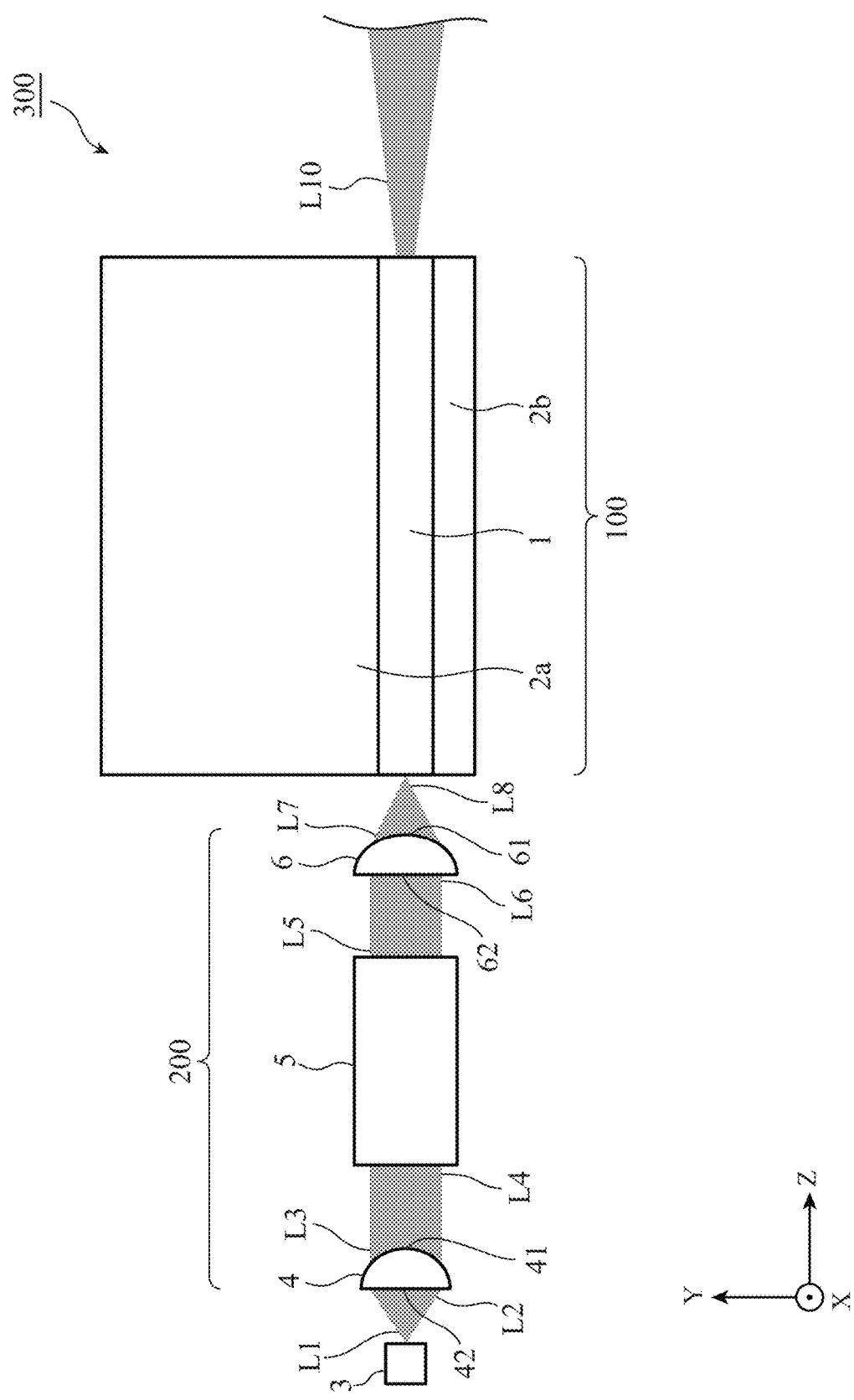
FIG. 3A is a side view illustrating the main part of the laser amplifier according to the first embodiment.
Figure 3B:
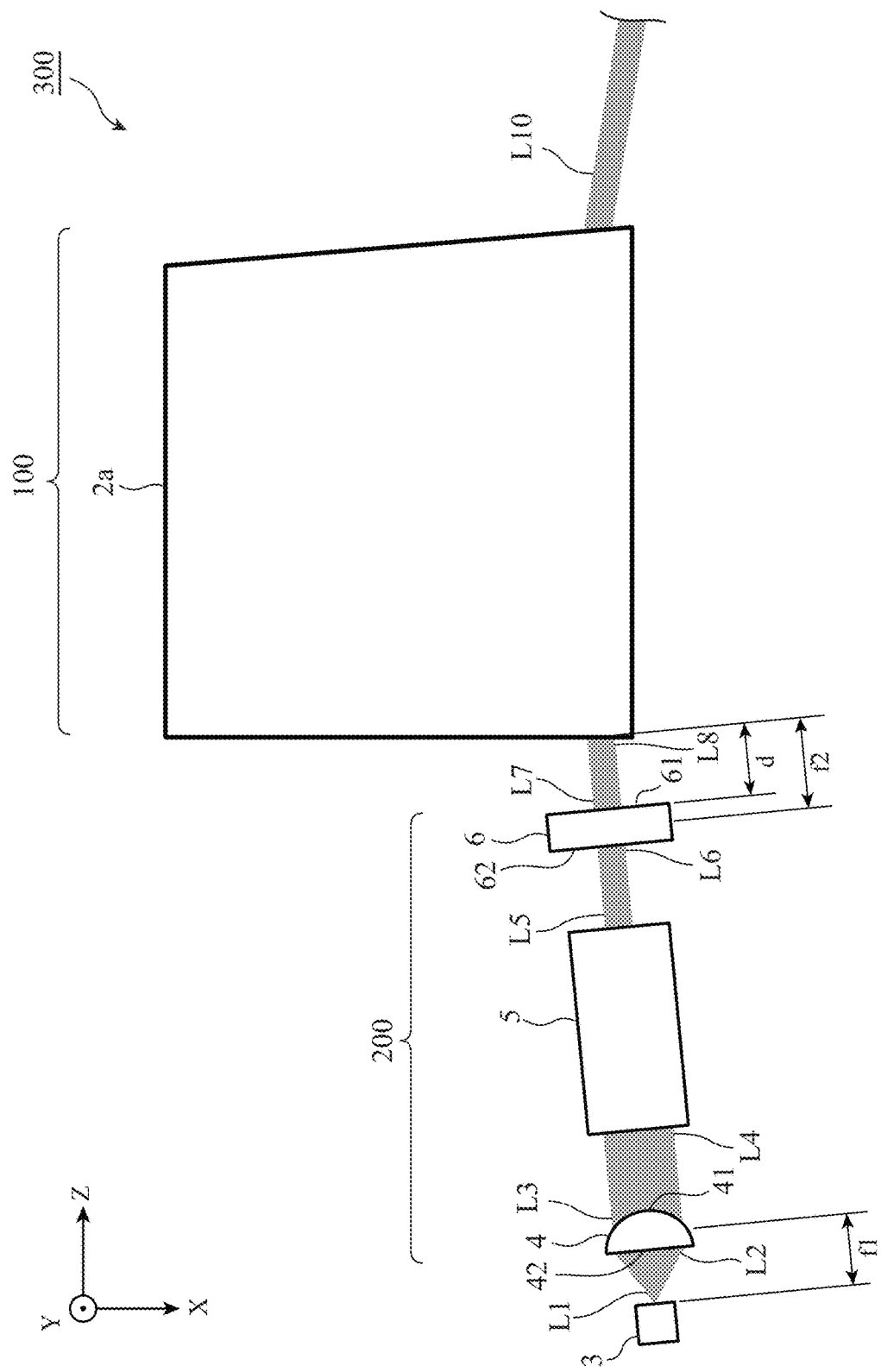
FIG. 3B is a plan view illustrating the main part of the laser amplifier according to the first embodiment.
Figure 4A:
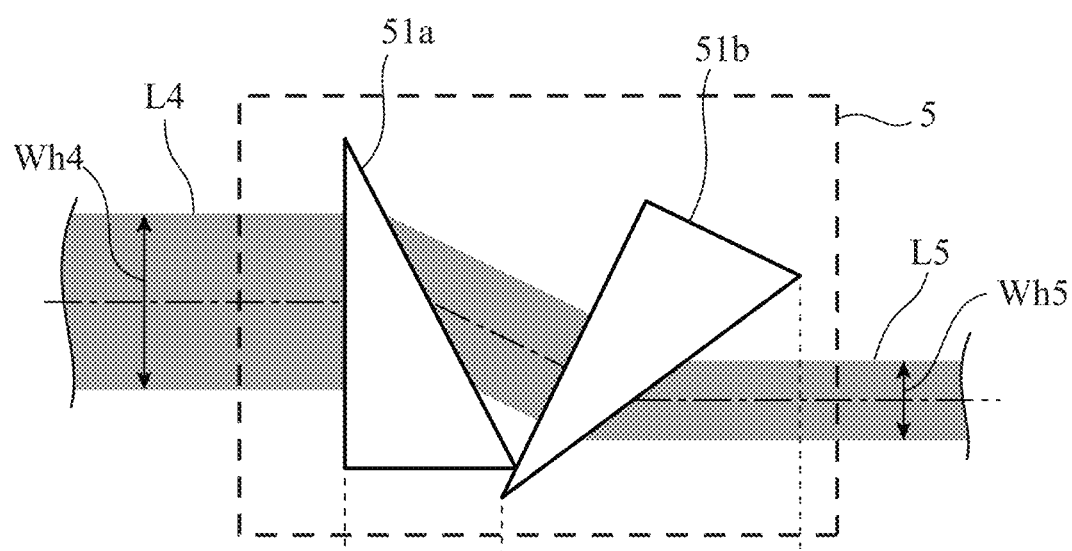
FIG. 4A is a plan view illustrating an anamorphic prism of an input optical system of the laser amplifier according to the first embodiment.
Figure 4B:
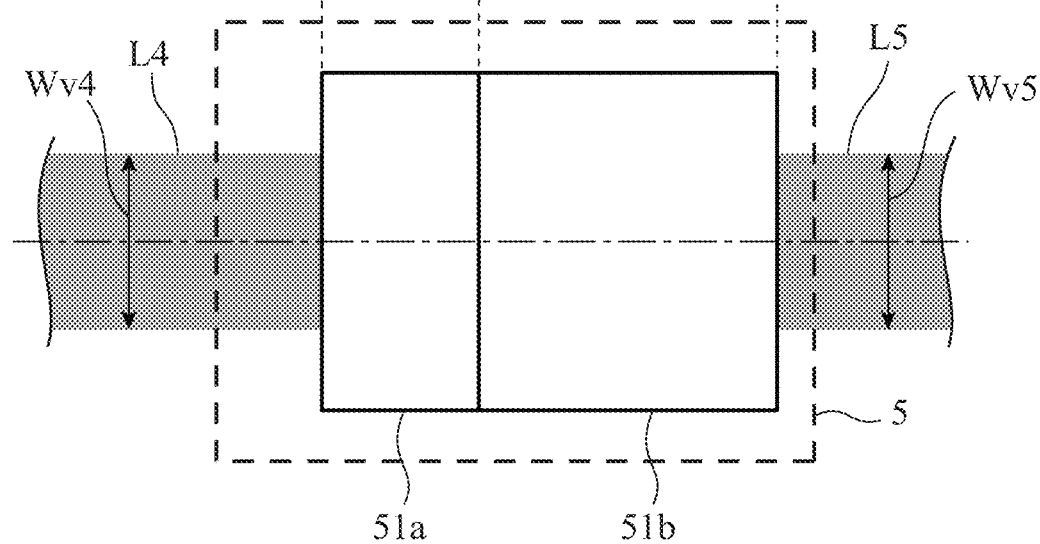
FIG. 4B is a side view illustrating the anamorphic prism of the input optical system of the laser amplifier according to the first embodiment.

FIG. 1 is a perspective view illustrating the main part of a laser amplifier according to a first embodiment. FIG. 2 is a plan view illustrating a core layer of a planar optical waveguide of the laser amplifier according to the first embodiment. FIG. 3A is a side view illustrating the main part of the laser amplifier according to the first embodiment. FIG. 3B is a plan view illustrating the main part of the laser amplifier according to the first embodiment. FIG. 4A is a plan view illustrating an anamorphic prism of an input optical system of the laser amplifier according to the first embodiment. FIG. 4B is a side view illustrating the anamorphic prism of the input optical system of the laser amplifier according to the first embodiment. A laser amplifier 300 of the first embodiment will be described with reference to FIGS. 1 to 4.

In the figures, L1 to L10 represent laser light to be amplified by the laser amplifier 300, that is, signal light. Symbols L1 to L8 denote signal light before amplification, L9 denotes signal light during amplification, and L10 denotes signal light after amplification. Note that excitation light is not illustrated.

In the figures, symbol 1 denotes a core layer. The core layer 1 is made of a laser medium that is an isotropic medium. Specifically, the core layer 1 is made of, for example, phosphate glass, silicate glass, fluoride glass, YAG, YGAG, ceramic YAG, or ceramic Lu2O3.

As illustrated in FIG. 2, the core layer 1 is quadrangular and has four side faces 11a, 11b, 11c, and 11d. The side faces 11a and 11b are arranged so as to face each other but are not parallel to each other. The side faces 11c and 11d are arranged so as to face each other and are parallel to each other. That is, the core layer 1 is trapezoidal.

The side face 11a has a portion (hereinafter referred to as "light incident surface") 12 to which signal light L8 before amplification is input. An antireflection film is provided on the light incident surface 12, and a high reflection film is provided on the remaining portion of the side face 11a. The anti-reflection film is formed by anti reflection (AR) coating. The high reflection film is formed by high reflection (HR) coating.

Of the incident angles θv and θh of the signal light L8 with respect to the core layer 1, the incident angle θv (not illustrated) in the vertical direction is set to, for example, zero degrees. Meanwhile, the incident angle θh in the horizontal direction is set to a value larger than zero degrees.

The side face 11b has a portion (hereinafter referred to as "light emitting surface") 13 from which the signal light L10 after amplification is output. The light emitting surface 13 is disposed so as to face the light incident surface 12, for example. An antireflection film is provided on the light emitting surface 13, and a high reflection film is provided on the remaining portion of the side face 11b. The antireflection film is formed by AR coating. The high reflection film is formed by HR coating.

The core layer 1 is disposed between two clad layers 2a and 2b. Each of the clad layers 2a and 2b is made of an isotropic medium and has a refractive index lower than that of the core layer 1. Specifically, for example, each of the clad layers 2a and 2b is made of, for example, phosphate glass, silicate glass, fluoride glass, YAG, YGAG, ceramic YAG, ceramic Lu2O3, a SiO2 film, a Ta2O5 film, an Al2O3 film, or a MgF2 film.

Hereinafter, the clad layer 2a that is one of the two clad layers 2a and 2b may be referred to as an "upper clad layer". The other clad layer 2b may be referred to as a "lower clad layer". The main part of a planar optical waveguide 100 includes the upper clad layer 2a, the core layer 1, and the lower clad layer 2b. That is, the planar optical waveguide 100 has a laminated structure including the upper clad layer 2a, the core layer 1, and the lower clad layer 2b.

A signal light source 3 outputs signal light L1. That is, the signal light source 3 has a surface (hereinafter, referred to as "light emitting surface") from which the signal light L1 is output. The signal light source 3 includes a laser light source having a single wavelength 2. Specifically, for example, the signal light source 3 includes a fiber laser, a semiconductor laser, or a solid-state laser. The wavelength 2 of the signal light L1 is set to a value that corresponds to the energy equivalent to the energy possessed by electrons in the laser medium of the core layer 1 when a population inversion state is formed.

Figure 5A:
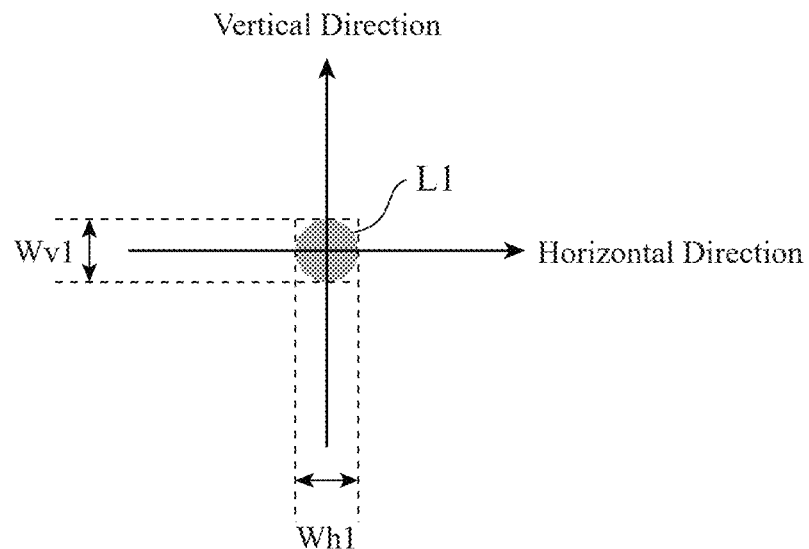
FIG. 5A is a cross-sectional view of output light from a signal light source.

FIG. 5A is a cross-sectional view of the output light L1 from the signal light source 3. More specifically, FIG. 5A is a cross-sectional view of the output light L1 on the light emitting surface of the signal light source 3. In the figure, Wv1 denotes the vertical beam width of the output light L1 on the light emitting surface of the signal light source 3. Furthermore, Wh1 denotes the horizontal beam width of the output light L1 on the light emitting surface of the signal light source 3. In the example illustrated in FIG. 5A, the signal light source 3 includes a fiber laser. Therefore, the cross-sectional shape of the output light L1 by the signal light source 3 is circular.

The output light L1 from the signal light source 3 is propagated in the air while gradually spreading and is input to a collimating lens 4. That is, the output light L1 from the signal light source 3 is input light L2 to the collimating lens 4. The collimating lens 4 converts the input light L2 into parallel light L3 and outputs the parallel light L3 that has been converted.

A front surface 41 of the collimating lens 4 is substantially spherical, and a back surface 42 of the collimating lens 4 is substantially flat. The collimating lens 4 has a focal point on the back surface 42 side. The light emitting surface of the signal light source 3 is disposed at a position that corresponds to the focal point of the collimating lens 4. In the figure, f1 denotes the focal length of the collimating lens 4.

Figure 5B:
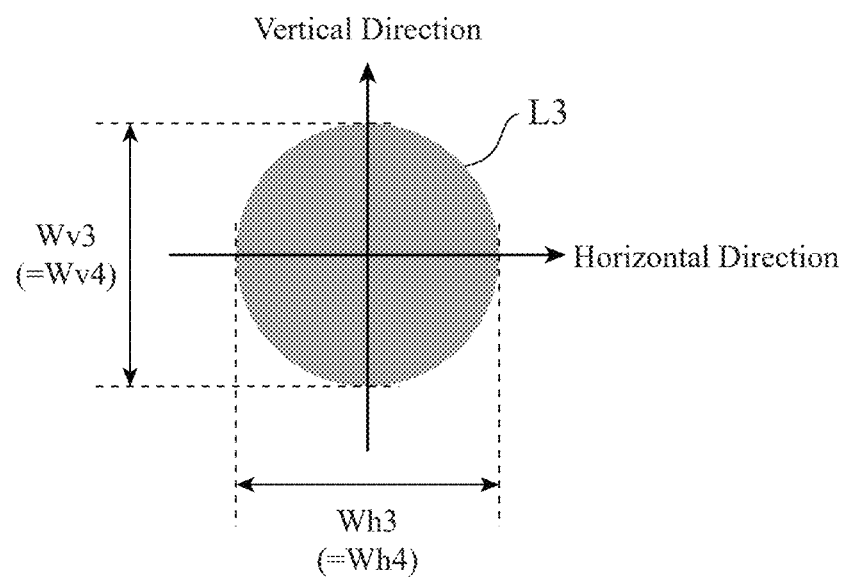
FIG. 5B is a cross-sectional view of output light from a collimating lens.

FIG. 5B is a cross-sectional view of the output light L3 from the collimating lens 4. In the figure, Wv3 denotes the vertical beam width of the output light L3 by the collimating lens 4. Meanwhile, Wh3 denotes the horizontal beam width of the output light L3 by the collimating lens 4. In the example illustrated in FIG. 5B, the cross-sectional shape of the output light L3 by the collimating lens 4 is circular. This is because the cross-sectional shape of the output light L1 by the signal light source 3 is circular, and thus the cross-sectional shape of the input light L2 to the collimating lens 4 is also circular.

Figure 5C:
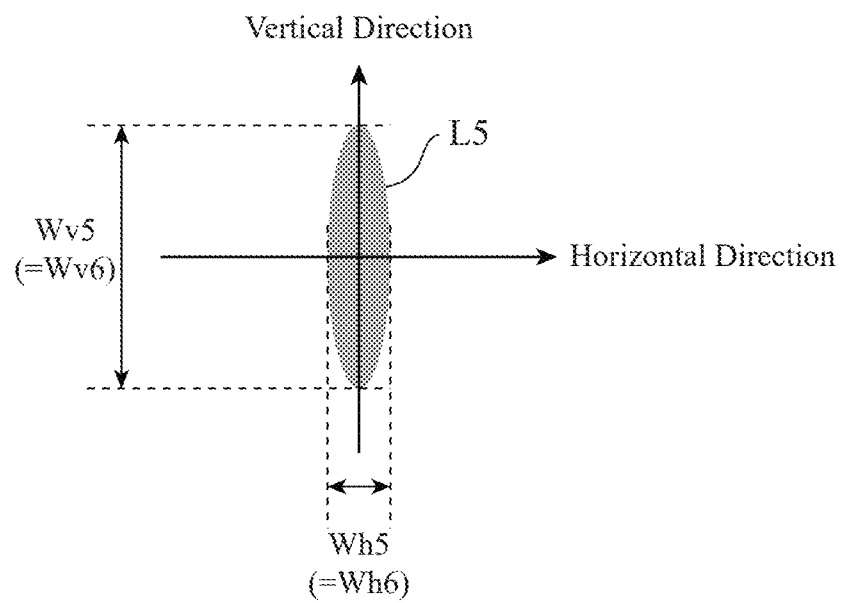
FIG. 5C is a cross-sectional view of output light from an anamorphic prism.

The output light L3 from the collimating lens 4 is propagated in the air and is input to an anamorphic prism 5. That is, the output light L3 from the collimating lens 4 is input light L4 for the anamorphic prism 5. The anamorphic prism 5 outputs parallel light L5 having a reduced horizontal beam width as compared to that of the input light L4. As illustrated in FIG. 4, the anamorphic prism 5 includes a pair of prisms 51a and 51b. FIG. 5C is a cross-sectional view of the output light L5 by the anamorphic prism 5.

In the figure, Wv4 denotes the vertical beam width of the input light L4 to the anamorphic prism 5. The vertical beam width Wv4 of the input light L4 is equivalent to the vertical beam width Wv3 of the output light L3 by the collimating lens 4. Meanwhile, Wh4 denotes the horizontal beam width of the input light L4 to the anamorphic prism 5. The horizontal beam width Wh4 of the input light L4 is equivalent to the horizontal beam width Wh3 of the output light L3 by the collimating lens 4.

In addition, Wv5 denotes the vertical beam width of the output light L5 by the anamorphic prism 5. The vertical beam width Wv5 of the output light L5 is equivalent to the vertical beam width Wv4 of the input light L4. Meanwhile, Wh5 denotes the horizontal beam width of the output light L5 by the anamorphic prism 5. The horizontal beam width Wh5 of the output light L5 is smaller than the horizontal beam width Wh4 of the input light L4. This is due to the beam width reducing function of the anamorphic prism 5.

The output light L5 from the anamorphic prism 5 is propagated in the air and is input to the cylindrical lens 6. That is, the output light L5 from the anamorphic prism 5 is input light L6 to the cylindrical lens 6. The cylindrical lens 6 condenses the input light L6 in the vertical direction. Output light L7 from the cylindrical lens 6 is propagated in the air and is input to the core layer 1. That is, the output light L7 from the cylindrical lens 6 is input light L8 to the core layer 1.

A front surface 61 of the cylindrical lens 6 has a substantially cylindrical curved surface shape, and a back surface 62 of the cylindrical lens 6 has a substantially flat surface shape. The cylindrical lens 6 has a focal point on the front surface 61 side. The light incident surface 12 of the core layer 1 is disposed at a position that corresponds to the focal point of the cylindrical lens 6. In the figure, f2 denotes the focal length of the cylindrical lens 6.

Figure 5D:
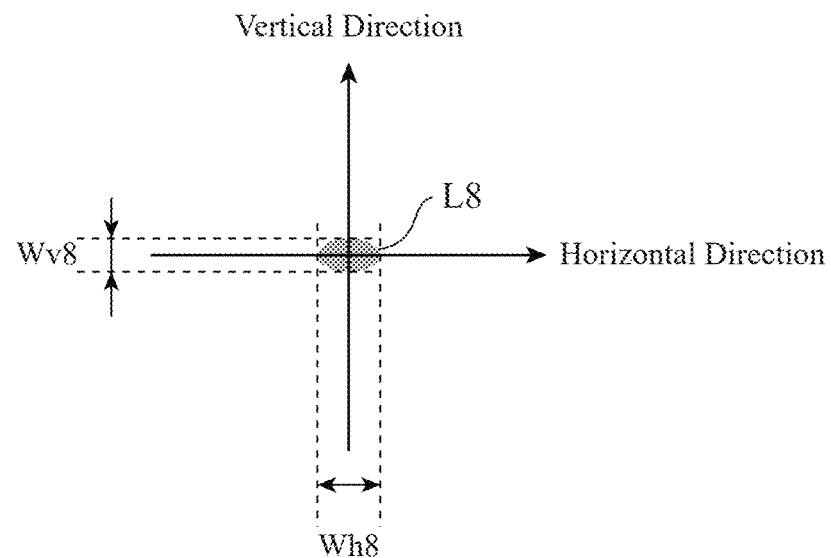
FIG. 5D is a cross-sectional view of input light to a core layer.

FIG. 5D is a cross-sectional view of the input light L8 to the core layer 1. More specifically, it is a cross-sectional view of the input light L8 on the light incident surface 12 of the core layer 1. In the figure, Wv8 denotes the vertical beam width of the input light L8 on the light incident surface 12 of the core layer 1. Meanwhile, Wh8 denotes the horizontal beam width of the input light L8 on the light incident surface 12 of the core layer 1.

The horizontal beam width Wh8 of the input light L8 on the light incident surface 12 of the core layer 1 is equivalent to the horizontal beam width Wh6 of the input light L6 to the cylindrical lens 6, that is, equivalent to the horizontal beam width Wh5 of the output light L5 by the anamorphic prism 5. Meanwhile, the vertical beam width Wv8 of the input light L8 on the light incident surface 12 of the core layer 1 is smaller than the vertical beam width Wv6 of the input light L6 to the cylindrical lens 6, that is, smaller than the vertical beam width Wv5 of the output light L5 from the anamorphic prism 5. This is due to the light condensing function of the cylindrical lens 6.

The vertical beam width Wv8 of the input light L8 on the light incident surface 12 of the core layer 1 is set to a value smaller than the horizontal beam width Wh8 of the input light L8 on the light incident surface 12 of the core layer 1. More specifically, the vertical beam width Wv8 of the input light L8 on the light incident surface 12 of the core layer 1 is set to a value less than or equal to the thickness t of the core layer 1. Therefore, it is possible to prevent the output light L7 from the cylindrical lens 6 from being emitted to the outside of the core layer 1. As a result, the coupling efficiency between the input optical system 200 and the planar optical waveguide 100 can be improved.

The main part of the input optical system 200 includes the collimating lens 4, the anamorphic prism 5, and the cylindrical lens 6. The main part of the laser amplifier 300 includes the planar optical waveguide 100 and the input optical system 200. In the figure, d indicates the installation interval between the cylindrical lens 6 and the planar optical waveguide 100, that is, the installation interval between the input optical system 200 and the planar optical waveguide 100.

Next, the operation by the laser amplifier 300 for amplifying signal light will be described.

First, an excitation light source (not illustrated) outputs excitation light. The excitation light that has been output is input to the core layer 1 from the side face 11c or the side face 11d. The excitation light that has been input is absorbed by the laser medium of the core layer 1, thereby forming a population inversion state.

In this state, the signal light source 3 outputs the signal light L1. As a result, the signal light L8 is input from the light incident surface 12 to the core layer 1. The signal light L9 that has been input is propagated inside the core layer 1, thereby amplifying the signal light L9 that has been input.

Here, each of the clad layers 2a and 2b has a refractive index lower than that of the core layer 1. Therefore, when the signal light L9 is propagated inside the core layer 1, the signal light L9 is totally reflected at the boundary surface between the core layer 1 and the upper clad layer 2a and at the boundary surface between the core layer 1 and the lower clad layer 2b. As a result, it is possible to suppress the signal light L9 from leaking from the core layer 1 to the clad layers 2a and 2b.

Furthermore, a high reflection film is provided for a portion of the side face 11a excluding the light incident surface 12, and a high reflection film is provided for a portion of the side face 11b excluding the light emitting surface 13. The side faces 11a and 11b are arranged non-parallel to each other. And, the incident angle θh of the signal light L8 with respect to the core layer 1 is set to a value larger than zero degrees.

Therefore, the signal light L9 is reflected by the side faces 11a and 11b a plurality of times when the signal light L9 is propagated inside the core layer 1. More specifically, the signal light L9 is alternately reflected by the side faces 11a and 11b. As a result, as illustrated in FIG. 1 or 2, the signal light L9 is propagated in a zigzag manner. As a result, the propagation path length of the signal light L9 in the laser medium can be increased with respect to the dimension of the core layer 1. Therefore, the gain of the laser amplifier 300 can be improved.

Note that the number of times the signal light L9 is reflected by the side faces 11a and 11b changes as the incident angle θh changes. As a result, the propagation path length of the signal light L9 changes. Therefore, it is preferable to set the incident angle θh to an appropriate value depending on the dimensions of the core layer 1 and a required propagation path length of the signal light L9 (that is, a required number of times of reflection of the signal light L9).

Next, a conventional laser amplifier 300' will be described with reference to FIG. 6. Furthermore, advantageous effects of the laser amplifier 300 of the first embodiment over the conventional laser amplifier 300' will be described.

Figure 6A:
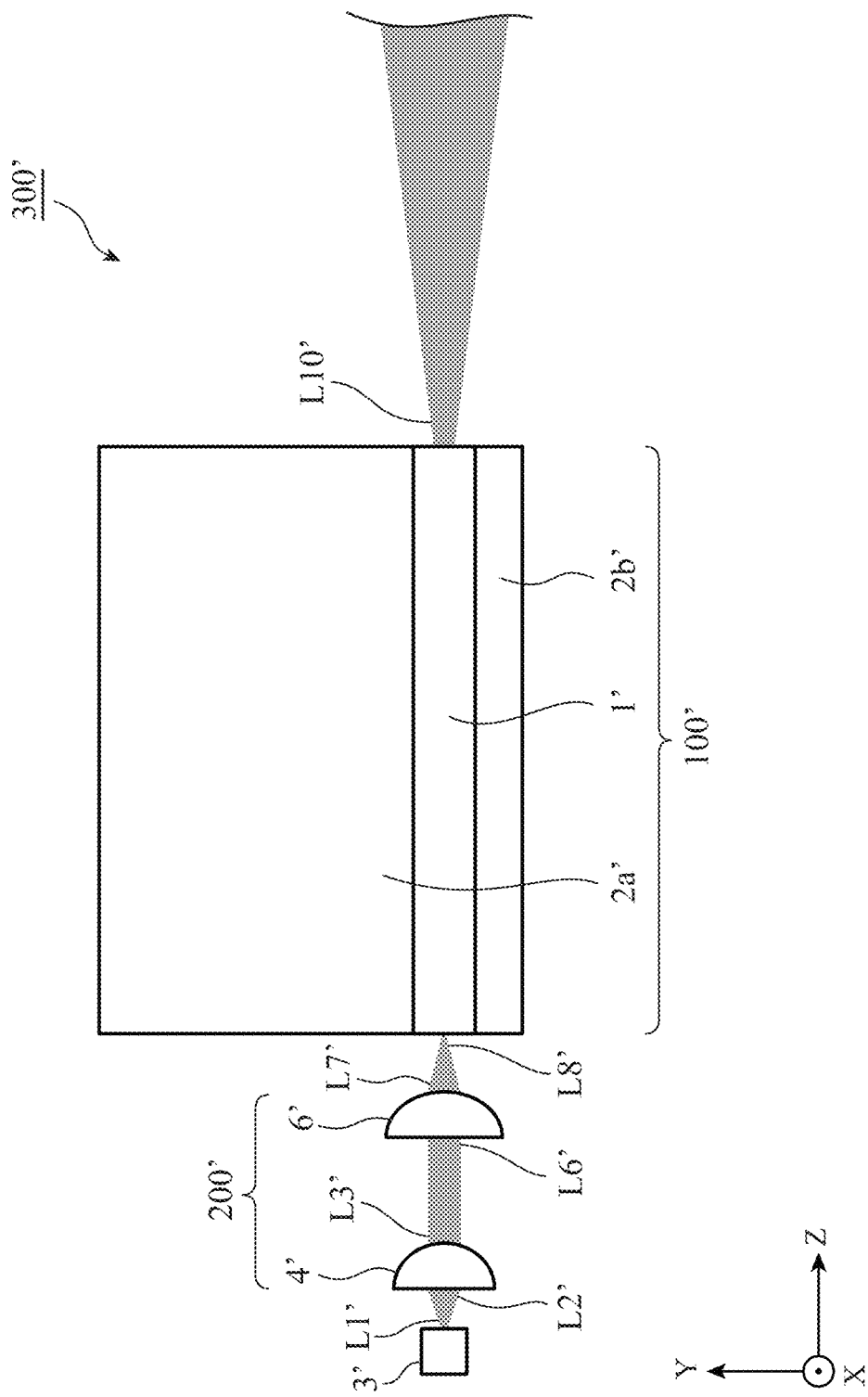
FIG. 6A is a side view illustrating the main part of a laser amplifier of the related art.
Figure 6B:
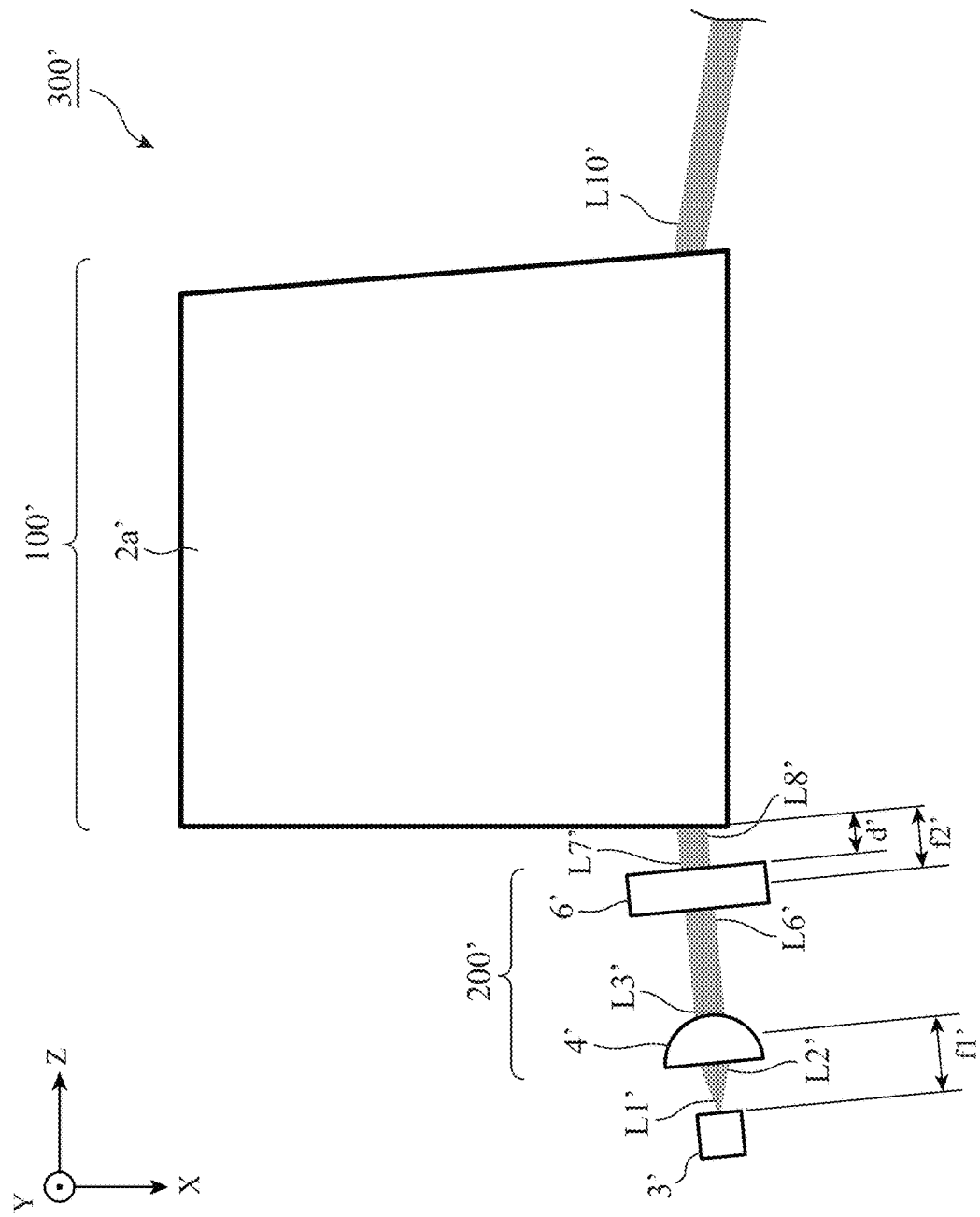
FIG. 6B is a plan view illustrating the main part of the laser amplifier of the related art.

As illustrated in FIG. 6, the conventional laser amplifier 300' has a planar optical waveguide 100'. The planar optical waveguide 100' has a laminated structure including an upper clad layer 2a', a core layer 1', and a lower clad layer 2b'. In the figure, L1' to L3' and L6' to L8' denote signal light before amplification, and L10' denotes signal light after amplification.

A signal light source 3' outputs signal light L1'. The output light L1' from the signal light source 3' is input light L2' to a collimating lens 4'. The collimating lens 4' converts the input light L2' to parallel light L3' and outputs the parallel light L3' that has been converted. A light emitting surface (not illustrated) of the signal light source 3' is disposed at a position that corresponds to the focal point of the collimating lens 4'. In the figure, f1' denotes the focal length of the collimating lens 4'.

The output light L3' from the collimating lens 4' is input light L6' to a cylindrical lens 6'. The cylindrical lens 6' condenses the input light L6' in the vertical direction. Output light L7' from the cylindrical lens 6' is input light L8' to the core layer 1'. A light incident surface (not illustrated) of the core layer 1' is disposed at a position that corresponds to the focal point of the cylindrical lens 6'. In the figure, f2' denotes the focal length of the cylindrical lens 6'.

The main part of the input optical system 200' includes the collimating lens 4' and the cylindrical lens 6'. The main part of the laser amplifier 300' includes the planar optical waveguide 100' and the input optical system 200'. In the figure, d' denotes the installation interval between the cylindrical lens 6' and the planar optical waveguide 100', that is, the installation interval between the input optical system 200' and the planar optical waveguide 100'.

The correspondence between the vertical beam width Wv8' of the input light L8' on the light incident surface of the core layer 1' and the vertical beam width Wv6' of the input light L6' to the cylindrical lens 6', that is, the correspondence between the vertical beam width Wv8' of the input light L8' on the light incident surface of the core layer 1' and the vertical beam width Wv3' of the output light L3' from the collimating lens 4' is expressed by the following equation (1). Meanwhile, the correspondence between the horizontal beam width Wh8' of the input light L8' on the light incident surface of the core layer 1' and the horizontal beam width Wh6' of the input light L6' to the cylindrical lens 6', that is, the correspondence between the horizontal beam width Wh8' of the input light L8' on the light incident surface of the core layer 1' and the horizontal beam width Wh3' of the output light L3' from the collimating lens 4' is expressed by the following equation (2).

$$Wv8' = (4 \times \lambda \times f2')/(\pi \times Wv3') \quad (1)$$

$$Wh8' = Wh3' \quad (2)$$

From the above equation (1), the vertical beam width Wv8' of the input light L8' on the light incident surface of the core layer 1' can be reduced by setting the vertical beam width Wv3' of the output light L3' from the collimating lens 4' to a large value or by setting the focal length f2' of the cylindrical lens 6' to a small value. Moreover, from the above equation (2), the horizontal beam width Wh8' of the input light L8' on the light incident surface of the core layer 1' can be reduced by setting the horizontal beam width Wh3' of the output light L3' from the collimating lens 4' to a small value.

However, the beam widths Wv3' and Wh3' of the output light L3' from the collimating lens 4' have values corresponding to the focal length f1' of the collimating lens 4'. That is, by increasing the focal length f1', both the beam widths Wv3' and Wh3' increase. On the other hand, by reducing the focal length f1', both the beam widths Wv3' and Wh3' decrease. Normally, the beam widths Wv3' and Wh3' are set by using the focal length f1' of the collimating lens 4'. Therefore, it is difficult to set one of the beam widths Wv3' and Wh3' to a large value while setting the other one of the beam widths Wv3' and Wh3' to a small value.

Therefore, in order to reduce the vertical beam width Wv8' of the input light L8' on the light incident surface of the core layer 1' while reducing the horizontal beam width Wh8' of the input light L8' on the light incident surface of the core layer 1', it is required to set the beam widths Wv3' and Wh3' of the output light L3' from the collimating lens 4' to small values and to set the focal length f2' of the cylindrical lens 6' to a small value. Since the focal length f2' is small, the installation interval d' between the input optical system 200' and the planar optical waveguide 100' is small. Therefore, there is a problem that it is difficult to adjust the installation position of the input optical system 200' with respect to the planar optical waveguide 100' when the laser amplifier 300' is assembled.

On the other hand, in the input optical system 200 in the laser amplifier 300 of the first embodiment, the anamorphic prism 5 is arranged between the collimating lens 4 and the cylindrical lens 6. With this configuration, it is not necessary to set the beam widths Wv3 and Wh3 of the output light L3 from the collimating lens 4 to small values in order to reduce the horizontal beam width Wh8 of the input light L8 on the light incident surface 12 of the core layer 1. As a result, the beam widths Wv3 and Wh3 of the output light L3 from the collimating lens 4 can be set to large values. Moreover, since the vertical beam width Wv3 of the output light L3 from the collimating lens 4 is large, it is not necessary to set the focal length f2 of the cylindrical lens 6 to a small value in order to reduce the vertical beam width Wv8 of the input light L8 on the light incident surface 12 of the core layer 1. As a result, the focal length f2 of the cylindrical lens 6 can be set to a large value.

That is, the laser amplifier 300 of the first embodiment uses the cylindrical lens 6 having the focal length f2 that is larger than that of the conventional laser amplifier 300', and thus it is possible to reduce the beam widths Wv8 and Wh8 of the input light L8 on the light incident surface 12 of the core layer 1. As a result, the installation interval d between the input optical system 200 and the planar optical waveguide 100 is larger than that of the conventional laser amplifier 300'. As a result, it is possible to facilitate adjustment of the installation position of the input optical system 200 with respect to the planar optical waveguide 100, when the laser amplifier 300 is assembled.

Next, another advantageous effect of the laser amplifier 300 of the first embodiment over the conventional laser amplifier 300' will be described.

In the conventional laser amplifier 300', the correspondence between the focal length f2' of the cylindrical lens 6' and the beam widths Wv8' and Wh8' of the input light L8' on the light incident surface of the core layer 1' is expressed by the following equation (3).

$$f2'=(\pi \times Wv8' \times Wh8')/(4 \times \lambda) \quad (3)$$

The focal length f2' is required to be set to a value corresponding to the required beam widths Wv8' and Wh8' on the basis of the above equation (3). For example, let us assume that the values of required beam widths Wv8' and Wh8' satisfy the conditions expressed by the following inequation (4). In this case, the focal length f2' is required to be set to a value larger than 1 millimeter and smaller than 6 millimeters.

$$1.0 < \{(\pi \times Wv8' \times Wh8')/(4 \times \lambda)\} < 6.0 \quad (4)$$

Generally, the focal length of an off-the-shelf cylindrical lens is set to a value less than or equal to 1 millimeter or a value greater than or equal to of 6 millimeters. Therefore, in a case where the values of required beam widths Wv8' and Wh8' satisfy the conditions expressed in the above inequation (4), off-the-shelf products cannot be used for the cylindrical lens 6'. Using a custom-made product for the cylindrical lens 6' causes a problem of increased development cost and manufacturing cost of the input optical system 200'.

Meanwhile, in the laser amplifier 300 of the first embodiment, it is not necessary to set the focal length f2 of the cylindrical lens 6 to a small value in order to reduce the beam widths Wv8 and Wh8 of the input light L8 on the light incident surface 12 of the core layer 1. Therefore, it is possible to implement required beam widths Wv8 and Wh8, using the cylindrical lens 6 having a desired focal length f2 that includes a value within the focal length range of off-the-shelf products (that is, a range of less than or equal to 1 millimeter or a range of greater than or equal to 6 millimeters). By using an off-the-shelf product as the cylindrical lens 6, the development cost and the manufacturing cost of the input optical system 200 can be reduced. In particular, by using the cylindrical lens 6 having a focal length f2 greater than or equal to 6 millimeters, it is possible to facilitate adjustment of the installation position of the input optical system 200 with respect to the planar optical waveguide 100 as described above.

Next, a laser amplifier 300" for comparison with the laser amplifier 300 of the first embodiment will be described with reference to FIG. 7. Furthermore, advantageous effects of the laser amplifier 300 of the first embodiment over the comparative laser amplifier 300" will be described.

Figure 7A:
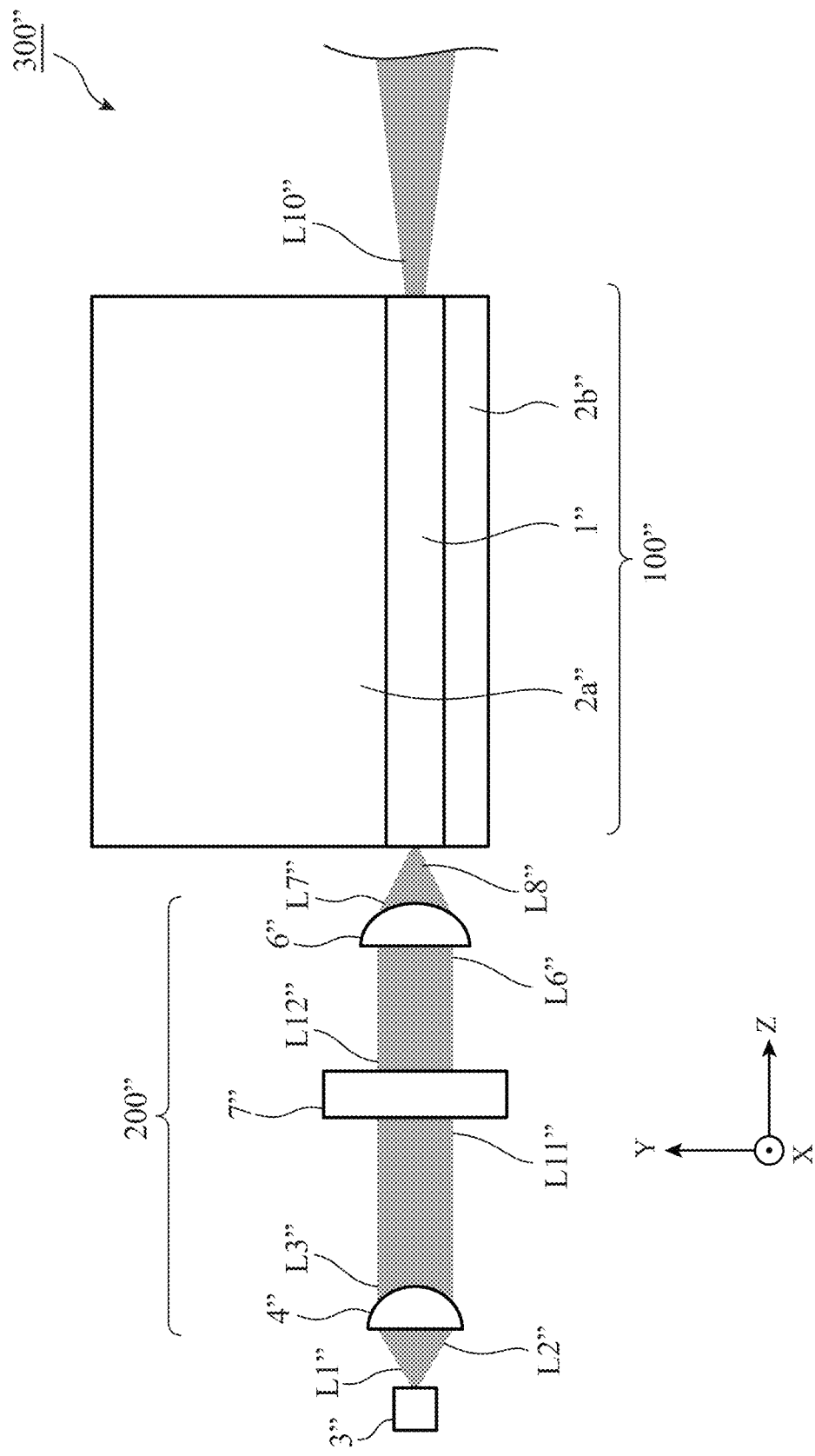
FIG. 7A is a side view illustrating the main part of a laser amplifier for comparison with the laser amplifier according to the first embodiment.
Figure 7B:
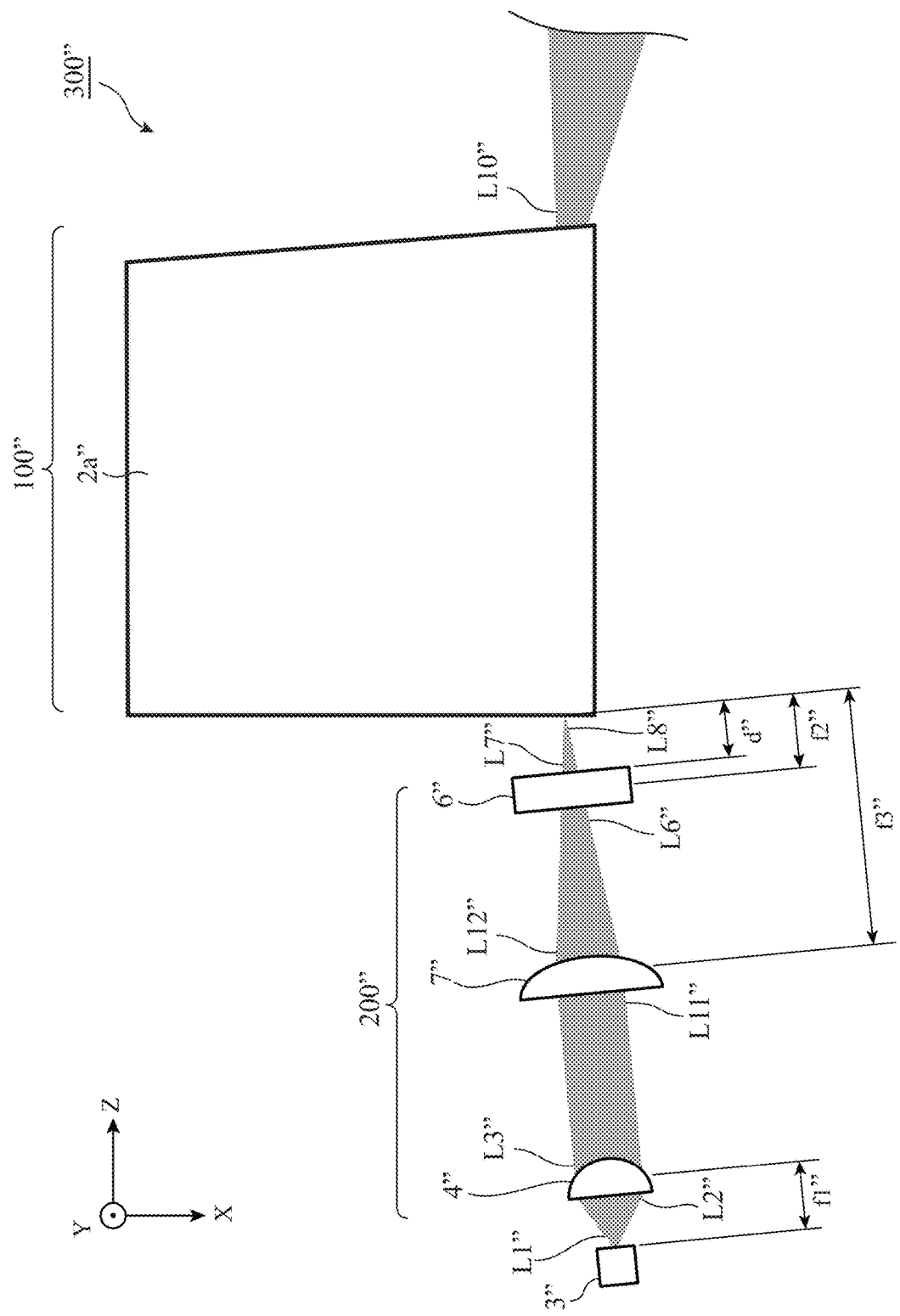
FIG. 7B is a plan view illustrating the main part of the laser amplifier for comparison with the laser amplifier according to the first embodiment.

As illustrated in FIG. 7, the comparative laser amplifier 300" has a planar optical waveguide 100". The planar optical waveguide 100" has a laminated structure including an upper clad layer 2a", a core layer 1" and a lower clad layer 2b". In the figure, L1" to L3", L6" to L8", L11", and L12" denote signal light before amplification, and L10" denotes signal light after amplification.

A signal light source 3" outputs signal light L1". The output light L1" from the signal light source 3" is input light L2" to a collimating lens 4". The collimating lens 4" converts the input light L2" to parallel light L3" and outputs the parallel light L3" that has been converted. A light emitting surface (not illustrated) of the signal light source 3" is disposed at a position that corresponds to the focal point of the collimating lens 4". In the figure, f1" denotes the focal length of the collimating lens 4".

The output light L3" from the collimating lens 4" is input light L11" to a cylindrical lens 7". The cylindrical lens 7" condenses the input light L11" in the horizontal direction. Output light L12" from the cylindrical lens 7" is input light L6" to a cylindrical lens 6". The cylindrical lens 6" condenses the input light L6" in the vertical direction. Output light L7" from the cylindrical lens 6" is input light L8" to the core layer 1".

The light incident surface (not illustrated) of the core layer 1" is disposed at a position corresponding to the focal point of the cylindrical lens 7" and is disposed at a position corresponding to the focal point of the cylindrical lens 6". In the figure, f3" denotes the focal length of the cylindrical lens 7", and f2" denotes the focal length of the cylindrical lens 6".

The main part of the input optical system 200" includes the collimating lens 4", the cylindrical lens 7", and the cylindrical lens 6". The main part of the laser amplifier 300" includes the planar optical waveguide 100" and the input optical system 200". In the figure, d" denotes the installation interval between the cylindrical lens 6" and the planar optical waveguide 100", that is, the installation interval between the input optical system 200" and the planar optical waveguide 100".

The laser amplifier 300 of the first embodiment implements a required vertical beam width Wv8, using the light condensing function of the cylindrical lens 6. Similarly, the comparative laser amplifier 300" implements a required vertical beam width Wv8", using the light condensing function of the cylindrical lens 6".

However, the comparative laser amplifier 300" implements a required horizontal beam width Wh8", using the light condensing function of the cylindrical lens 7". Therefore, the horizontal beam width Wh9" (not illustrated) of signal light L9" gradually increases when the signal light L9" input to the core layer 1" is propagated inside the core layer 1". As a result, the horizontal beam width Wh10" of output light L10" on the light emitting surface (not illustrated) of the core layer 1" is greater than the horizontal beam width Wh8" of the input light L8" on the light incident surface of the core layer 1. Moreover, the horizontal beam width Wh10" of the output light L10" gradually increases when the output light L10" from the core layer 1" is propagated in the air. As a result, in a case where the output light L10" from the core layer 1" is input to another optical system (hereinafter referred to as "output optical system"), the coupling efficiency between the planar optical waveguide 100" and the output optical system decreases.

Meanwhile, the laser amplifier 300 of the first embodiment implements a required horizontal beam width Wh8, using the beam width reduction function of the anamorphic prism 5. Therefore, it is possible to suppress the horizontal beam width Wh9 of the signal light L9 from gradually increasing when the signal light L9 is propagated inside the core layer 1. As a result, it is possible to make the horizontal beam width Wh10 of the output light L10 on the light emitting surface 13 of the core layer 1 substantially equivalent to the horizontal beam width Wh8 of the input light L8 on the light incident surface 12 of the core layer 1. It is also possible to suppress the horizontal beam width Wh10 of the output light L10 from gradually increasing when the output light L10 from the core layer 1 is propagated in the air. As a result, the coupling efficiency between the planar optical waveguide 100 and the output optical system can be improved.

Next, a modification of the core layer 1 will be described with reference to FIG. 8.

Figure 8A:
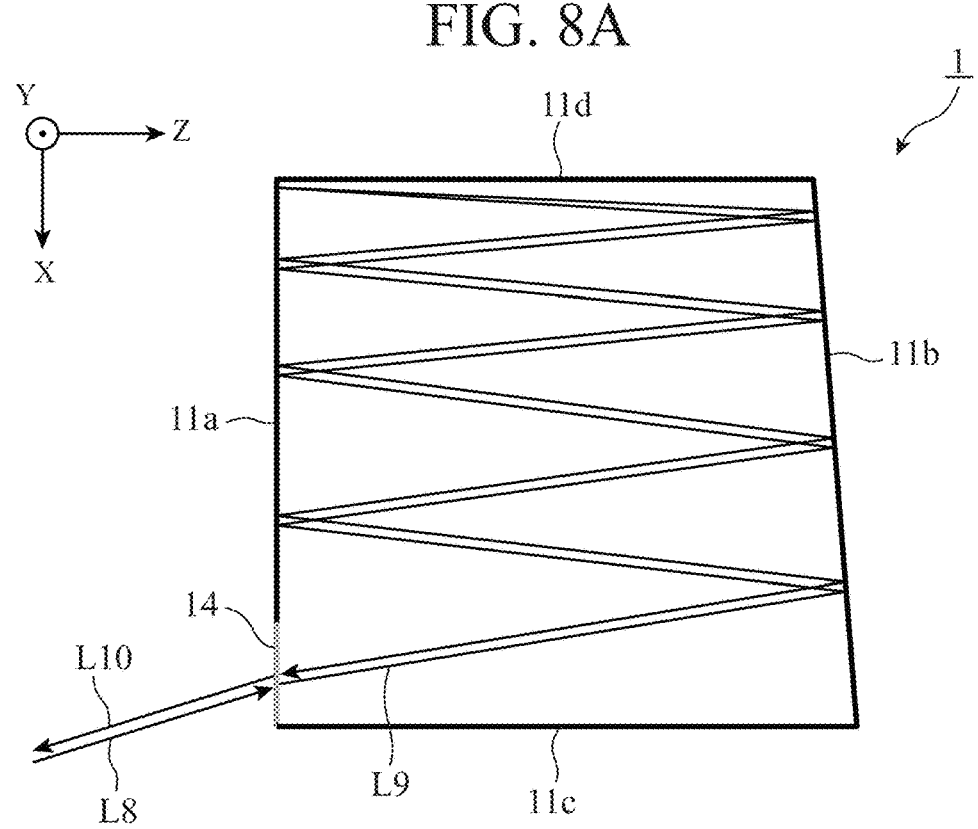
FIG. 8A is a plan view illustrating another core layer of the planar optical waveguide of the laser amplifier according to the first embodiment.

As illustrated in FIG. 8A, the side face 11a of the core layer 1 may include a portion (hereinafter referred to as "light incident and emitting surface") 14 where the signal light L8 before amplification is input and the signal light L10 after amplification is output. In this case, the outward path of the signal light L9 inside the core layer 1 may be a similar path to the return path of the signal light L9 inside the core layer 1.

Figure 8B:
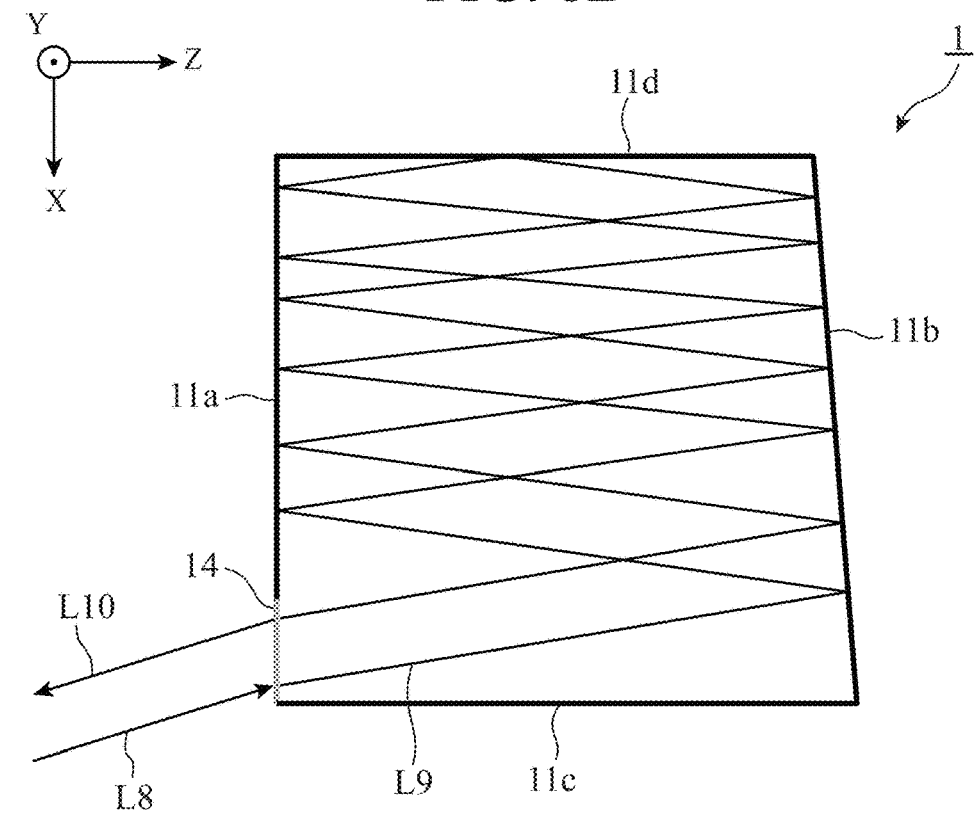
FIG. 8B is a plan view illustrating another core layer of the planar optical waveguide of the laser amplifier according to the first embodiment.

Alternatively, a light incident and emitting surface 14 may be included on the side face 11a of the core layer 1 as illustrated in FIG. 8B. In this case, the outward path of the signal light L9 inside the core layer 1 may be a different path from the return path of the signal light L9 inside the core layer 1. Note that, in the example illustrated in FIG. 8B, a high reflection film may be provided on the side face 11d.

Next, another modification of the core layer 1 will be described with reference to FIG. 9.

Figure 9A:
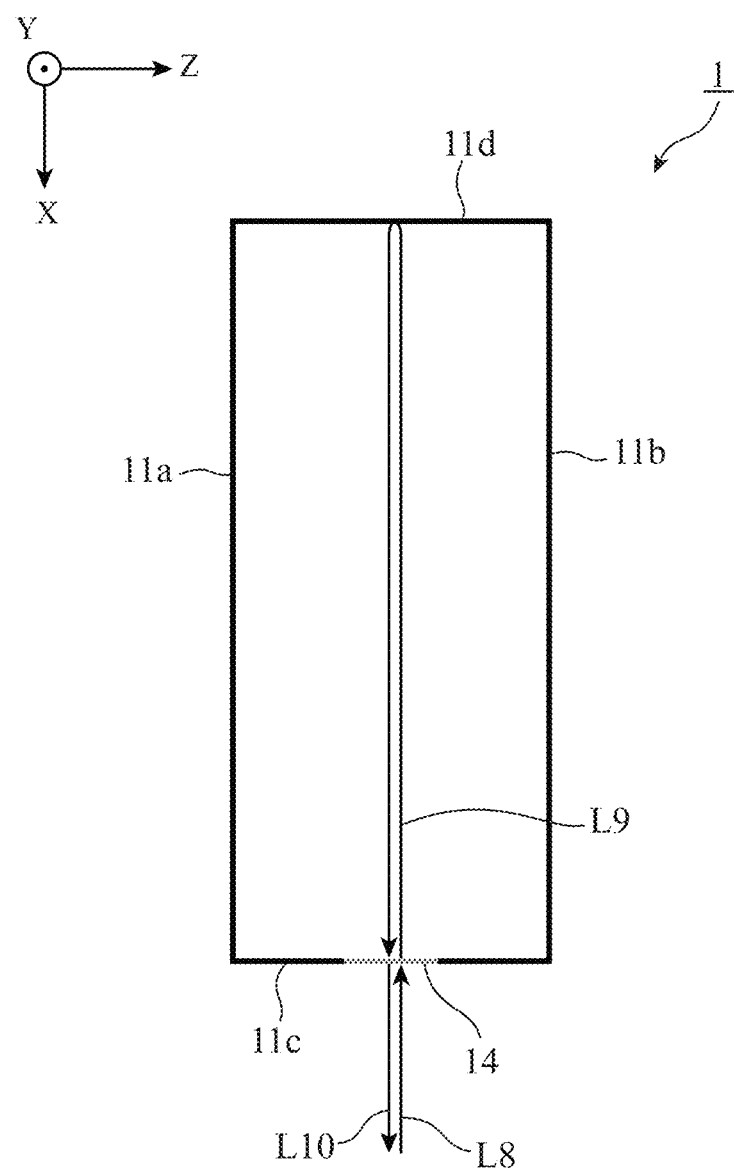
FIG. 9A is a plan view illustrating another core layer of the planar optical waveguide of the laser amplifier according to the first embodiment.

As illustrated in FIG. 9A, the core layer 1 may have a rectangular shape, the side faces 11a and 11b may correspond to the long sides of the rectangle, and the side faces 11c and 11d may correspond to the short sides of the rectangle. In this case, the light incident and emitting surface 14 may be included on the side face 11c. As a result, the propagation path of the signal light L9 extends along the longitudinal direction of the core layer 1. As a result, it is possible to ensure the propagation path length of the signal light L9 while eliminating the need for reflection of the signal light L9 by the side faces 11a and 11b. Note that, in the example illustrated in FIG. 9A, a high reflection film may be provided on the side face 11d.

Figure 9B:
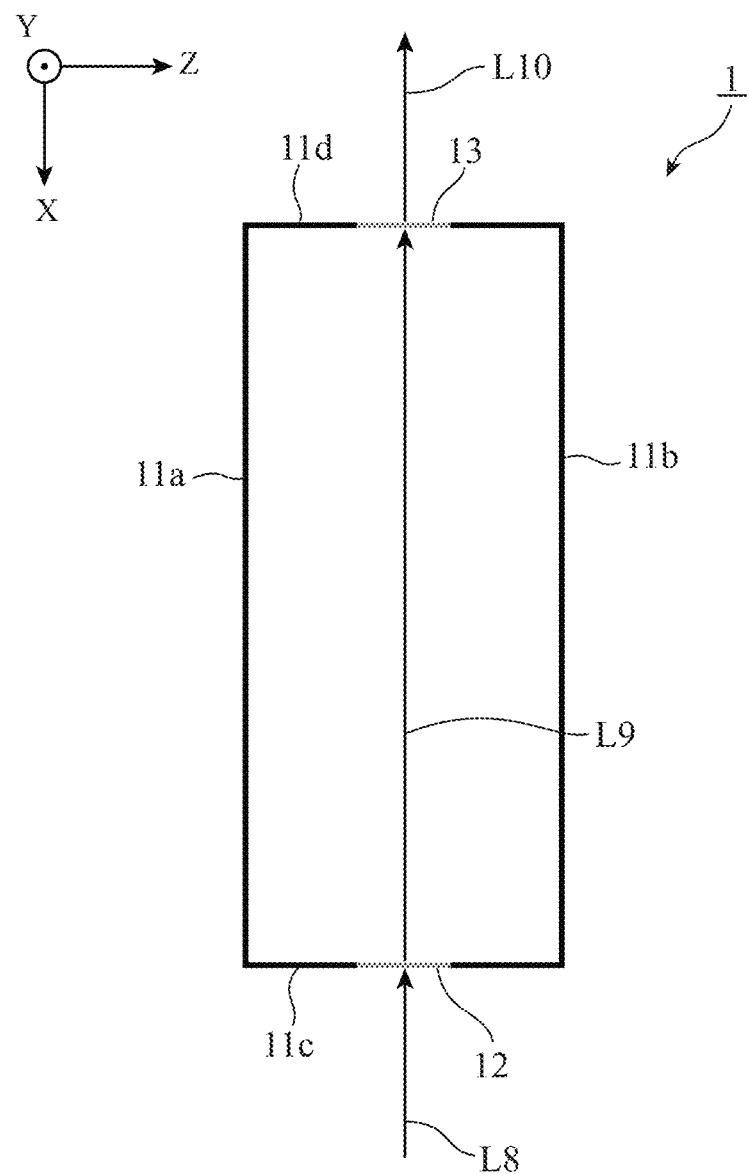
FIG. 9B is a plan view illustrating another core layer of the planar optical waveguide of the laser amplifier according to the first embodiment.

Alternatively, as illustrated in FIG. 9B, the core layer 1 may have a rectangular shape, the side faces 11a and 11b may correspond to the long sides of the rectangle, and the side faces 11c and 11d may correspond to the short sides of the rectangle. In this case, the light incident surface 12 may be included on the side face 11c, and the light emitting surface 13 may be included on the side face 11d. As a result, the propagation path of the signal light L9 extends along the longitudinal direction of the core layer 1. As a result, it is possible to ensure the propagation path length of the signal light L9 while eliminating the need for reflection of the signal light L9 by the side faces 11a and 11b.

Next, another modification of the laser amplifier 300 will be described.

The direction in which the beam width is reduced by the anamorphic prism 5 (hereinafter referred to as the "first direction") is not limited to the horizontal direction. Likewise, the light condensing direction by the cylindrical lens 6 (hereinafter referred to as the "second direction") is not limited to the vertical direction. For example, the anamorphic prism 5 may reduce the beam width in the vertical direction, and the cylindrical lens 6 may condense light in the horizontal direction.

However, in order to meet the demand for thinning of the core layer 1, it is preferable to set the first direction to the horizontal direction and the second direction to the vertical direction, from the viewpoint of making the vertical beam width Wv8 further smaller than the horizontal beam width Wh8. From the viewpoint of suppressing the horizontal beam width Wh9 from gradually increasing inside the core layer 1, it is also preferable to set the first direction to the horizontal direction and the second direction to the vertical direction.

As described above, the laser amplifier 300 of the first embodiment includes the planar optical waveguide 100 for laser amplification and the input optical system 200 for inputting signal light to the core layer 1 of the planar optical waveguide 100. The input optical system 200 includes: the collimating lens 4 for converting output light from the signal light source 3 into parallel light: the anamorphic prism 5 for reducing the beam width in the first direction of output light from the collimating lens 4; and the cylindrical lens 6 for collecting output light from the anamorphic prism 5 in the second direction, and output light from the cylindrical lens 6 is input to the core layer 1. Since the anamorphic prism 5 is included, it is not necessary to set the beam widths Wv3 and Wh3 of the output light L3 from the collimating lens 4 to small values in order to reduce the beam widths Wv8 and Wh8 of the input light L8 on the light incident surface 12 of the core layer 1. Therefore, it is not necessary to set the focal length f2 of the cylindrical lens 6 to a small value. Since the installation interval d between the input optical system 200 and the planar optical waveguide 100 is large, it is possible to facilitate adjustment of the installation position of the input optical system 200 with respect to the planar optical waveguide 100.

Moreover, the planar optical waveguide 100 has the laminated structure including the upper clad layer 2a, the core layer 1, and the lower clad layer 2b, and the first direction is set to be orthogonal to the lamination direction in the laminated structure. With this configuration, it is possible to implement a required horizontal beam width Wh8, using the beam width reduction function of the anamorphic prism 5. It is also possible to suppress the horizontal beam width Wh9 of the signal light L9 inside the core layer 1 from gradually increasing during propagation and to suppress the horizontal beam width Wh10 of the output light L10 from the core layer 1 from gradually increasing during propagation. As a result, the coupling efficiency between the planar optical waveguide 100 and the output optical system can be improved.

Moreover, the planar optical waveguide 100 has the laminated structure including the upper clad layer 2a, the core layer 1, and the lower clad layer 2b, and the second direction is set to be parallel with the lamination direction in the laminated structure. With this configuration, a required vertical beam width Wv8 can be implemented, using the light condensing function of the cylindrical lens 6. Specifically, for example, it is possible to implement a vertical beam width Wv8 that is further smaller than the horizontal beam width Wh8. It is further possible to implement a vertical beam width Wv8 that is less than or equal to the wall thickness t of the core layer 1.

In addition, the focal length f2 of the cylindrical lens 6 is set to a value greater than or equal to 6 millimeters. As a result, an off-the-shelf product can be used as the cylindrical lens 6. As a result, the development cost and the manufacturing cost of the input optical system 200 can be reduced. Furthermore, as described above, it is possible to facilitate adjustment of the installation position of the input optical system 200 with respect to the planar optical waveguide 100.

In addition, in the side faces 11a and 11b of the core layer 1, antireflection films are provided for a portion to which the signal light is input (light incident surface 12) and for a portion from which the signal light is output (light emitting surface 13), and high reflection films are provided for the other portions of the side faces 11a and 11b. With this configuration, a structure is implemented in which the signal light L9 is reflected by the side faces 11a and 11b a plurality of times when the signal light L9 is propagated inside the core layer 1, more specifically, a structure in which the signal light L9 is alternately reflected by the side faces 11a and 11b.

The planar optical waveguide 100 has a structure in which the signal light input to the core layer 1 is reflected by the side faces 11a and 11b of the core layer 1 a plurality of times when the signal light is propagated inside the core layer 1. With this configuration, the propagation path length of the signal light L9 in the laser medium can be made longer than the dimension of the core layer 1. As a result, the gain of the laser amplifier 300 can be improved.

The planar optical waveguide 100 has a laminated structure including the upper clad layer 2a, the core layer 1, and the lower clad layer 2b, and, of beam widths of the signal light input to the core layer 1, a beam width in a direction orthogonal to the lamination direction in the laminated structure is set to a value less than or equal to the thickness t of the core layer 1. As a result, the coupling efficiency between the input optical system 200 and the planar optical waveguide 100 can be improved.

Note that the present invention may include modifications of any component of the embodiment or omission of any component of the embodiment within the scope of the present invention.

INDUSTRIAL APPLICABILITY

A laser amplifier of the present invention can be used, for example, for amplifying laser light for measurement or communication.

REFERENCE SIGNS LIST

1: core layer, 2a: clad layer (upper clad layer), 2b: clad layer (lower clad layer), 3: signal light source, 4: collimating lens, 5: anamorphic prism, 6: cylindrical lens, 11a: side face, 11b: side face, 11c: side face, 11d: side face, 12: light incident surface, 13: light emitting surface, 14: light incident and emitting surface, 41: front surface, 42: back surface, 51a: prism, 51b: prism, 61: front surface, 62: back surface, 100: planar optical waveguide, 200: input optical system, 300: laser amplifier

The invention claimed is:

1. A laser amplifier comprising: a planar optical waveguide for laser amplification; and an input optical system to input signal light to a core layer of the planar optical waveguide, wherein the input optical system includes:

a collimating lens to convert output light from a signal light source into parallel light;

an anamorphic prism to convert output light from the collimating lens into parallel light having a reduced beam width in a first direction; and a cylindrical lens to collect output light from the anamorphic prism in a second direction, and output light from the cylindrical lens is input to the core layer, as the signal light having been collected in the second direction and to be propagated inside the core layer without changing the beam width in the first direction, and wherein the planar optical waveguide has a laminated structure including an upper clad layer, the core layer, and a lower clad layer, the first direction is set to be orthogonal to a lamination direction in the laminated structure, the second direction is set to be parallel to the lamination direction in the laminated structure, and in a side face of the core layer, an antireflection film is provided for a portion to which the signal light is input or a portion from which the signal light is output, and a high reflection film is provided for another portion of the side face.

2. The laser amplifier according to claim 1, wherein a focal length of the cylindrical lens is set to a value greater than or equal to 6 millimeters.

3. The laser amplifier according to claim 1, wherein the planar optical waveguide has a structure in which the signal light input to the core layer is reflected by side faces of the core layer a plurality of times when the signal light is propagated inside the core layer.

4. The laser amplifier according to claim 1, wherein, of beam widths of the signal light input to the core layer, a beam width in a direction along the lamination direction in the laminated structure is set to a value less than or equal to a thickness of the core layer.

* * * * *